April 20, 1948.  W. C. GREEN  2,440,198
PRESSURE-DETECTING COVERING
Filed Oct. 1, 1943  2 Sheets-Sheet 2
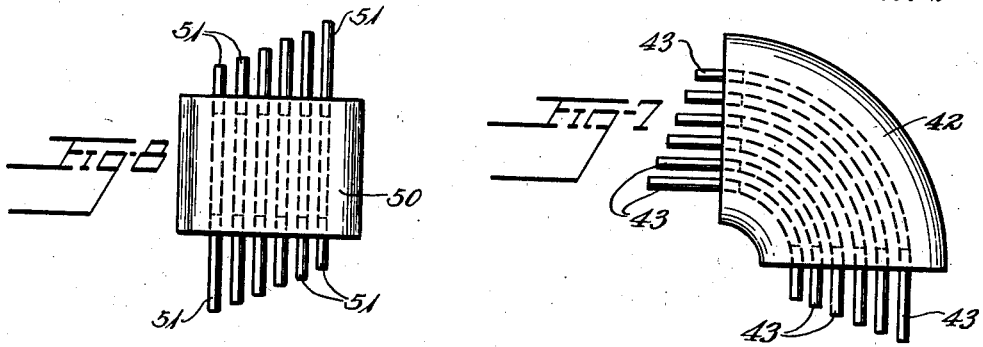
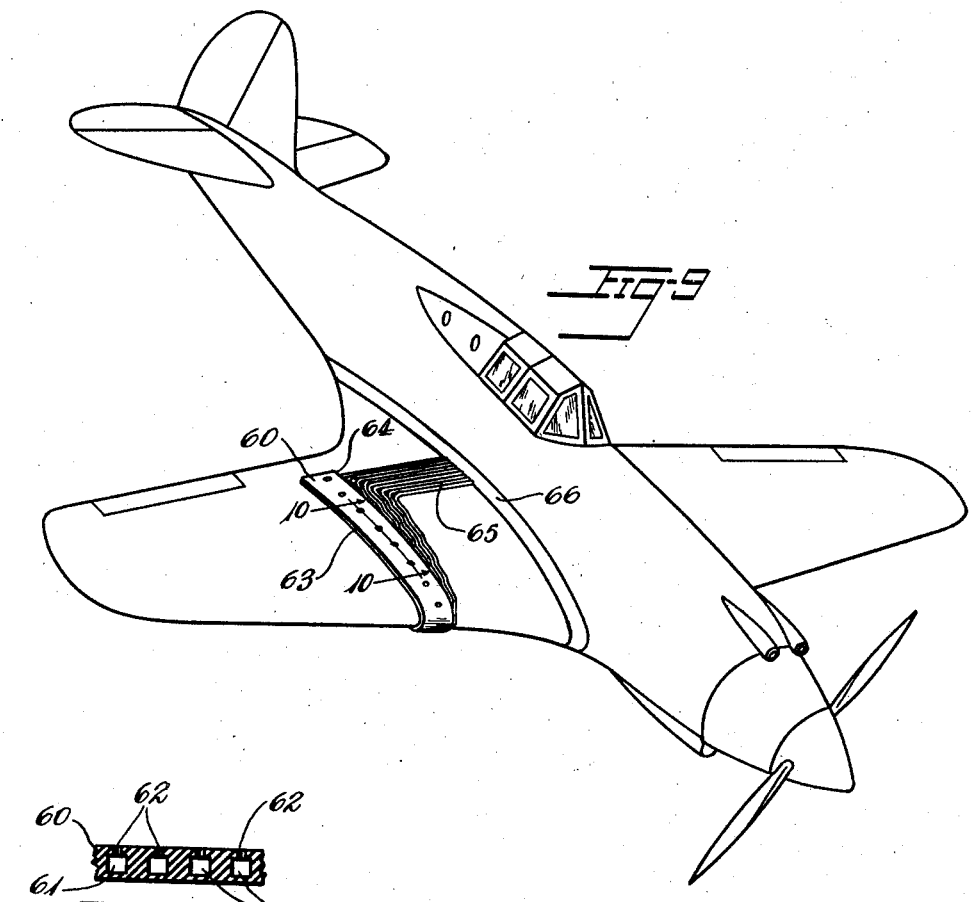
Inventor
William C. Green
By Willis F. Avery
Atty.

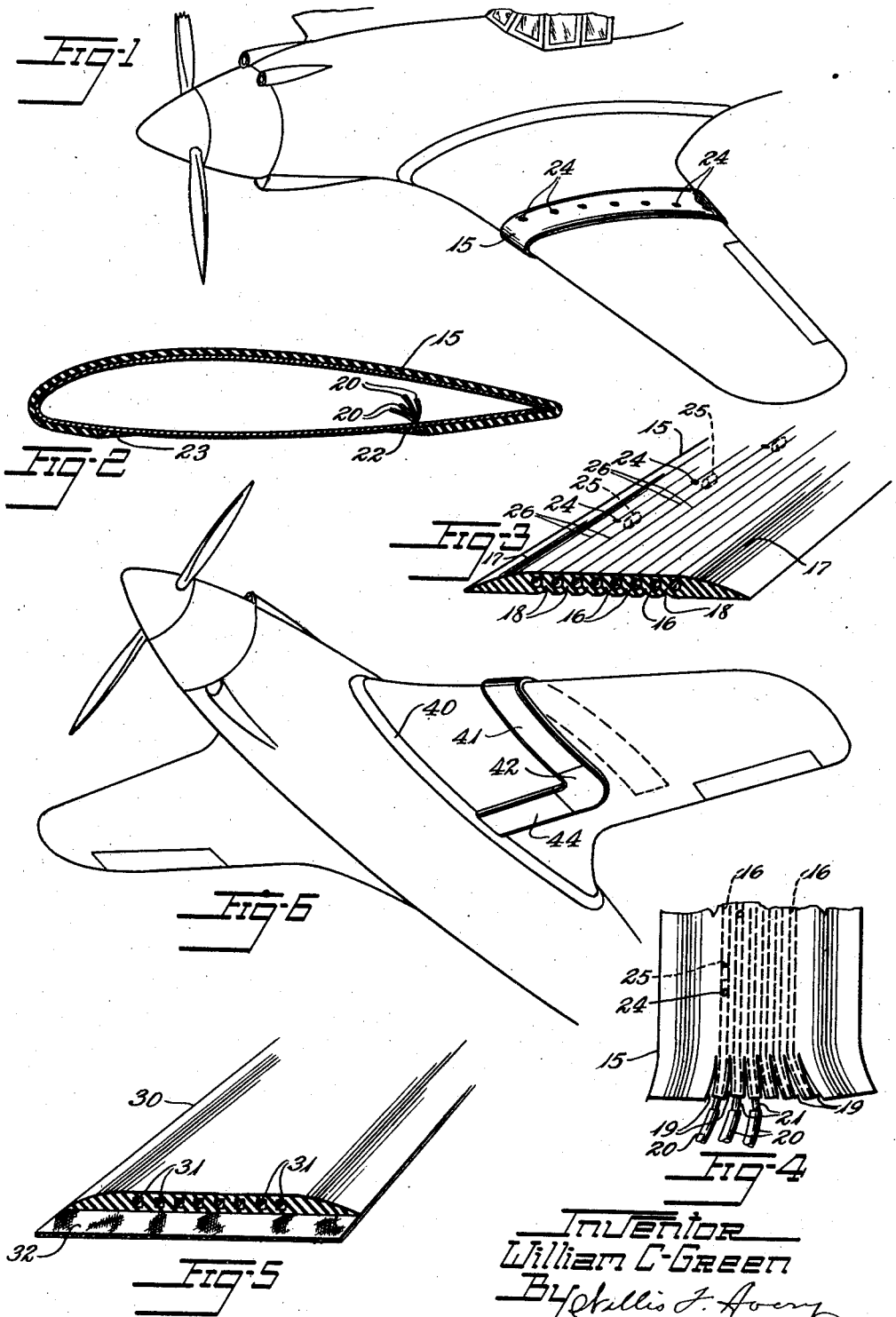

Patented Apr. 20, 1948

2,440,198

UNITED STATES PATENT OFFICE 2,440,198

PRESSURE-DETECTING COVERING

William C. Green, Akron, Ohio, assignor to The B. F. Goodrich Company, New York, N. Y., a corporation of New York Application October 1, 1943, Serial No. 504,563

7 Claims. (Cl. 73—147)

This invention relates to the detecting of fluid pressures at positions along surfaces for the determination of the distribution of such pressures, and is useful especially in the detecting of such pressures along wings and other surfaces of aircraft in actual flight as well as in wind tunnels.

An object of the invention is to provide a covering for the surface of such flexibility that it can be conformed to the surfaces with the outer face of the covering corresponding substantially to the conformation of the surface, so that pressures registered at the surface of the covering will correspond closely with pressures on the uncovered surface. A further object is to provide in such a covering a plurality of passages for conducting air or other pressure fluid between positions along the covering and positions removed therefrom more convenient for the indicating or registering of the pressures by manometric or other devices.

A further object is to provide for detecting the pressures over the surface without requiring apertures or other modification or mutilation of the original surface which alteration is undesirable in many cases such as where the surface is the stressed skin of an airfoil. Further objects are to provide for convenience of manufacture, installation and use.

These and further objects will be apparent from the following description, reference being had to the accompanying drawings in which:

Fig. 1 is a perspective view, partly in section, of the top side of an airfoil, showing a pressure detecting covering thereon constructed in accordance with and embodying the invention.

Fig. 2 is a cross section of the airfoil covering of Fig. 1.

Fig. 3 is a cross section and perspective view of the covering strip of Fig. 1.

Fig. 4 is a plan view of the covering strip at one end thereof.

Fig. 5 is a view like Fig. 3, but showing a modified construction.

Fig. 6 is a perspective view as seen from below of an aircraft wing with a covering strip mounted thereon together with a leading-in strip and connecting part therefor.

Fig. 7 is a plan view of the connecting part of Fig. 6.

Fig. 8 is a plan view of a modified connecting part.

Fig. 9 is a perspective view as seen from above of an aircraft wing having a further modified construction of pressure-detecting strip mounted thereon.

Fig. 10 is a section taken along the line 10—10 of Fig. 9.

In order to obtain reliable readings of air pressures at positions across and along aircraft wings or other surfaces it is desirable to provide a plurality or even a multitude of openings at the surface, which openings are in communication individually or collectively as desired with pressure indicating devices at different places in the aircraft, and it is desirable also to provide for obtaining such readings without objectionable modification thereof as a result of aerodynamic characteristics of the applied apparatus. In accordance with the invention a pressure-detecting covering is provided which can be conformed closely to the aircraft surface despite compound curvature thereof and readings of pressures may be obtained at the surface of the covering corresponding substantially to the pressures that would exist on the uncovered surface.

In the embodiment of Figs. 1 to 4 the covering comprises a strip 15 of flexible rubber, or other rubber-like material, having a plurality of interior passages 16, 16 extending side by side longitudinally of the strip, which strip is adhered by cement or otherwise secured to the surface at which it is desired to detect the pressures at positions along the same. Owing to the flexibility of the strip it is conformable to the surface so that the outer face of the strip assumes substantially the same profile shape as the underlying surface of the wing or other part. The strip preferably is formed with rounded or tapered margins 17, 17 and at its under side may be notched as at 18, 18 between the passages 16, 16 to promote flexibility of the strip and to facilitate separation at the ends of the strip at 19, 19 (Fig. 4) for greater convenience of making connections. The connections, which may comprise lengths of hose or tubing 20, 20 are joined to the strip as by means of nipples 21, 21. By terminating the strip 15 at the rear portion of the wing, preferably the lower surface thereof as shown in Fig. 2, the connections 20, 20, or the strip 15 itself, may be led through apertures or a slit in the wing and to a position within the fuselage for connection to the manometers or other pressure indicating devices, or the connections may be led along the surface of the wing, if desired. A fairing 22 may be provided at this end of the strip 15 and a fairing 23 may be provided at the other end of the strip.

Each passage may be for the purpose of detecting the pressure at a single position on the surface and for this purpose may be opened to the surface through a single aperture. A plurality of such apertures is shown in Fig. 1, at 24, 24 these being spaced-apart chordwise of the wing and being staggered so as to be individually in communication with the passages within the covering. The passages may be sealed at the end of the strip at 23 so that only the air from the apertures is conducted through the tubes, or for the sake of increased sensitivity each passage may be blocked immediately behind each aperture, as by means of plugs 25 (Fig. 3).

In the case where it is desired to form the apertures 24, 24 in the covering at the time of installation, rather than during manufacture of the strip, the location of the apertures may be facilitated by the provision on the face of the covering of light scoring lines or marks 26, 26 overlying the center of the passages. The strip 15 may be made in any suitable manner as by molding or extrusion, or vulcanizing together assembled pieces of rubber-like material, and the covering may be made in long strips for cutting off into shorter lengths as needed or it may be made to individual sizes as desired.

The term "rubber-like material" as used herein includes not only rubber, whether natural or synthetic, but also materials possessing the desired impervious and flexible characteristics for this purpose such as gutta percha, balata, copolymers of butadiene with styrene, acrylonitrile, polyisobutylene and its copolymers, plasticizer copolymers of vinyl compounds, and so on.

The covering strip 30 of the embodiment of Fig. 5 is like that of Fig. 3 except that the passages 31, 31 are rectangular rather than circular in cross section and the covering is provided at its inner surface with a layer 32 of fabric or other suitable reinforcing material which may be desirable in some cases to facilitate handling and also the obtaining of a strong adhesion of the strip to the surface, as well as to facilitate removal and reapplication.

In the embodiment of Fig. 6 the covering is mounted upon the wing of an aircraft having a detachable curved fairing strip 40, and provision is made for leading conduits from the pressure detecting covering along the lower surface of the wing and into the fuselage at the margin of the fairing strip, which may be loosened for this purpose and retightened on the aircraft with the conducting strip 44 held in place. The pressure detecting covering as indicated at 41 may be of the construction for example of Fig. 3 or Fig. 5. At the rear end of the strip is mounted an elbow connecting piece 42, shown especially in Fig. 7, which has a plurality of curved passages therein corresponding in spacing to the passages in the strip 41. At the ends of the passages in the elbow piece 42 are provided a plurality of nipples or tubes 43, 43. These preferably terminate at different distances beyond the connector to facilitate insertion into the passages in the covering strip 41 and into the conducting strip indicated at 44. By cementing or otherwise adhering these parts to the wing surface, no alteration or mutilation of the wing skin is required. Suitable sealing compounds may be used at the connections if desired. The disposition of the conducting strip 44 at the rear of the wing offers minimum disturbance of the normal air flow of the wing, especially at the leading edge thereof and at the upper surface of the wing so that reliable readings in the latter areas may be had.

In cases where it is desired to connect several pieces of pressure indicating coverings together in line, the connecting piece shown in Fig. 8 may be used. Here a rectangular piece 50 having passages extending therethrough corresponding to passages in the covering strip has at its opposite ends tubes or nipples 51, 51 extending therefrom for insertion into the passages in the strips to be connected as in the case of the elbow connector of Fig. 7, the tubes 51, 51 preferably terminating at different distances from the piece 50 to facilitate insertion into the passages to be connected. The piece 50 like the other parts may be secured as by adhesion to the wing or other surface.

In the coverings of Figs. 1 and 6 the passages extend longitudinally of the strip and thus chordwise of the wing in the positions of the covering strip as shown. In some cases it may be desired to use a spanwise disposition of the passages with a chordwise spacing of the apertures in line, and in this case a covering as shown in Figs. 9 and 10 may be utilized. Here, the covering, indicated at 60, has a plurality of passages 61, 61 extending therethrough, each passage communicating with one of a series of apertures 62, 62. This construction is of advantage where it is desired that the apertures be in direct alignment chordwise of the wing rather than have the staggered arrangement of Fig. 1. The passages 61, 61, are closed at one margin 63 of the strip, or these passages may be closed closer to the apertures if desired. At the opposite margin 64 of the strip the ends of the passages are connected by tubes or other conductors which may be led into the fuselage of the aircraft either by traversing a portion of the wing surface toward its rear where aerodynamic influence will be at a minimum, or by being led through holes provided in the wing for the purpose. As shown in Fig. 9 the conduits 65 are led under a fairing strip 66 of the aircraft.

Variations may be made without departing from the scope of the invention as it is hereinafter claimed.

I claim:

1. A surface covering for use in detecting air pressures at positions along an aircraft surface, said covering comprising relatively thin flexible rubber-like strip material conformable to the surface with the outer face of the covering corresponding substantially to the conformation of the surface whereby local aerodynamic conditions remain substantially unaltered by the presence of said covering, said covering having a plurality of passages in the interior thereof in side by side relation for individually conducting air between positions at the exposed surface of the covering and positions at a margin thereof, and coupling means at said margin individually communicating with said passages.

2. A covering as defined in claim 1 in which said passages extend in the lengthwise direction of the strip.

3. A covering as defined in claim 1 in which said passages extend crosswise of the strip.

4. A surface covering for use in detecting air pressures at positions along an aircraft surface, said covering comprising flexible rubber-like material conformable to the surface with the outer face of the covering corresponding substantially to the conformation of the surface whereby local aerodynamic conditions remain substantially unaltered by the presence of said covering, said covering having a plurality of passages in the interior thereof in side by side relation and apertures in the face of said covering individually in communication with said passages, and means for conducting air between said passages individually and positions remote from said covering, said means comprising connectors insertable in said passages at a margin of the covering.

5. A covering strip for use in detecting air pressures along a surface in airflow comprising a relatively thin strip of flexible impervious material conformable to the surface with the outer face of the strip corresponding substantially to the conformation of said surface whereby local aerodynamic conditions remain substantially unaltered by the presence of the strip, said strip having a plurality of passageways extending internally of the strip, and said strip having apertures in its outer face for pressure communication of said passages individually with the air at said outer face.

6. A covering strip for use in detecting air pressures along a surface in airflow comprising a relatively thin strip of flexible impervious material conformable to the surface with the outer face of the strip corresponding substantially to the conformation of said surface whereby local aerodynamic conditions remain substantially unaltered by the presence of the strip, said strip having a plurality of internal passageways extending longitudinally of the strip, and said strip having apertures at longitudinally spaced-apart positions along said face of the strip for pressure communication of said passages individually with the outer air at said positions.

7. A pressure-detecting covering strip for a surface in airflow comprising a relatively thin strip of flexible impervious material conformable to the surface with the outer face of the strip corresponding substantially to the conformation of said surface whereby local aerodynamic conditions remain substantially unaltered by the presence of the strip, said strip having spaced-apart apertures in said face and a plurality of passageways individually in communication with said apertures and extending internally of the strip to positions at the edge of the strip individually remote from said apertures.

WILLIAM C. GREEN.

REFERENCES CITED

The following references are of record in the file of this patent:

UNITED STATES PATENTS

| Number | Name | Date |
| --- | --- | --- |
| 917,276 | Faught | Apr. 6, 1909 |
| 998,916 | Mercer | July 25, 1911 |
| 1,351,538 | Reynolds | Aug. 31, 1920 |
| 2,051,042 | Hendel et al. | Aug. 18, 1936 |

FOREIGN PATENTS

| Number | Country | Date |
| --- | --- | --- |
| 263,664 | Germany | Aug. 29, 1913 |